United States Patent
Utyashev et al.

(10) Patent No.: US 6,826,940 B2
(45) Date of Patent: Dec. 7, 2004

(54) METHOD OF METAL AND ALLOY BILLET TREATMENT

(75) Inventors: Farid Zainullaevich Utyashev, Ufa (RU); Oscar Akramovich Kaibyshev, Ufa (RU); Oleg Rayazovich Valiakhmetov, Ufa (RU)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/768,021

(22) Filed: Feb. 2, 2004

(65) Prior Publication Data

US 2004/0163436 A1 Aug. 26, 2004

Related U.S. Application Data

(62) Division of application No. 09/806,403, filed as application No. PCT/US99/22564 on Sep. 30, 1999, now Pat. No. 6,718,809.

(30) Foreign Application Priority Data

Jan. 10, 1998 (RU) .......................................... 98117983

(51) Int. Cl.⁷ .............................................. B21D 19/00
(52) U.S. Cl. .............................. 72/100; 72/77; 72/364; 72/378
(58) Field of Search ............................... 72/67, 69, 77, 72/78, 84, 95, 98, 100, 112, 302, 342.94, 364, 377, 378

(56) References Cited

U.S. PATENT DOCUMENTS

| | | | | |
|---|---|---|---|---|
| 3,492,849 A | * | 2/1970 | Marcovitch ..................... | 72/75 |
| 3,699,797 A | * | 10/1972 | Tournoy ....................... | 72/286 |
| 3,954,001 A | * | 5/1976 | Tsukamoto et al. ........... | 72/469 |
| 3,961,514 A | * | 6/1976 | Geary ........................... | 72/274 |
| 4,188,813 A | * | 2/1980 | Bournicon et al. ............ | 72/299 |
| 4,238,944 A | * | 12/1980 | Duffy ............................ | 72/84 |
| 4,459,164 A | * | 7/1984 | Yoshioka et al. ............ | 148/128 |
| 4,836,866 A | * | 6/1989 | Thuse .......................... | 148/570 |
| 5,001,916 A | * | 3/1991 | Schuler et al. ................ | 72/96 |
| 5,353,493 A | * | 10/1994 | Harada et al. ................ | 72/76 |

FOREIGN PATENT DOCUMENTS

| | | | | |
|---|---|---|---|---|
| DE | 3400315 | * | 9/1984 | ..................... 72/75 |
| JP | 57-137043 | * | 8/1982 | ..................... 72/69 |
| JP | 57-202919 | * | 12/1982 | ................ 72/342.1 |
| JP | 63-123545 | * | 5/1988 | ..................... 72/92 |
| SU | 724259 | * | 3/1980 | ..................... 72/69 |
| SU | 1333441 | * | 8/1987 | ..................... 72/69 |
| SU | 1722631 | * | 3/1992 | ................. 72/151 |

* cited by examiner

*Primary Examiner*—Ed Tolan
(74) *Attorney, Agent, or Firm*—Andrew J. Caruso; Philip D. Freedman (57) ABSTRACT

This method refers to a method by which the physical and mechanical properties intrinsic to a fine-grain structure may be formed in metal billets using pressure treatment. The method is designed to treat rods, bars and other particularly long billets. This method is designed to lower the cost of deformational treatment for long rods and large diameter billets and creates a pre-specified microstructure, including micro-crystal structure, and specific physical and mechanical properties. This may be achieved using various treatment techniques, one of which includes the deformation of at least a part of the billet through reduction of the billets cross-section. In this method, a long rod shaped billet is used. Reduction of the cross-section is achieved using tools that permit movement along and across the billet's axis as well as being rolled about its surface, for example, a roller. In this case at least one support stand is employed for correct placement of the billet. Additionally, a pre-specified strain level is achieved using at least one of the techniques of deformation: torsion, settling and extension using tools, for example the above-mentioned stand. The stand is designed to apply a specified scheme of deformation to the billet at the deformed (strained) section and at a specified temperature. This obtains specified structure with intrinsic physical and mechanical properties.

23 Claims, 5 Drawing Sheets

METHOD OF METAL AND ALLOY BILLET TREATMENT

This application is a division of application Ser. No. 09/806,403, filed Mar. 30, 2001 which is a 371 of national stage application No. PCT/US99/22564 filed Sep. 30, 1999.

BACKGROUND OF THE INVENTION

This method relates to a method of pressure treatment for metal billets that have specified physical and mechanical properties, which are derived from their fine grain structural characteristics. The method relates to treating rods, bars and other particularly long billets.

It is known that physical and mechanical properties, for example strength and plasticity, depend on a material's microstructure. Therefore, changes to the microstructure characteristics may change these properties. For example, it is usually necessary to create a cellular or sub-grain microstructure within the material to strengthen a material.

Large physical and mechanical changes of a material's properties may be achieved by refining the micro-crystal grains, for example those grains that are sized from 10 to 0.1 µm. These materials, when compared with coarse grain materials, exhibit significantly higher strength characteristics. At higher temperatures these materials exhibit low flow pressure and higher levels of plasticity, or even superplasticity. In order to form a micro-crystal structure, it may be necessary to use more radical deformation techniques than those used to create other types of fragmented microstructures, for example sub-grain microstructures.

Known billet deformational treatment methods comprise equal-channel angular extrusion and pressure torsion. These methods are used to produce billets with specified physical and chemical characteristics, because the methods produce known micro-crystal structures. These methods also permit the development of small mass and sized fine-grain billets. These methods are, however, highly labor and energy intensive.

Another metal and alloy deformational treatment method comprises deformation that is done by multiple reduction steps and is generally followed by an increase in cross-section by extrusion and upsetting. This method permits development of small sized rods from soft materials, in which the rods have smaller physical and chemical properties.

Billet treatment involves significant energy consumption because of the force required to overcome friction that is generated when the surface of the machine tool and billet meet to overcome hydro-static pressure created during extrusion, for example extrusion using backwater. This method is generally unsuitable for the production of large-sized billets, for example billets in the form of rods that are five to six meters in length with a 150–200 mm minimal diameter formed from a hard to deform alloy. In this situation, it is necessary to use an apparatus including a press that can develop up to several tens of thousands of ton pressure as well suitable machine tools. Typically rods with a micro-crystal structure or grains sized from 3 to 8 µm and a diameter of 30 to 40 mm are produced by multi-operational forging or rolling methods from billets with an initial diameter of 400 mm or larger.

SUMMARY OF THE INVENTION

The method reduces the cost of deformational treatment for long rods and large diameter billets that require a specified internal microstructure, including micro-crystal microstructure, and specified physical and mechanical properties. This specified internal microstructure may be achieved using various treatment methods, including deformation of a billet section through reduction of a billet's cross-section. Reduction of the cross-section uses tools, for example a roller, that permit movement along and across the billet's axis and as well being spinning the billet about its surface. At least one support stand can be used for correct positioning and placement of the billet. Additionally, a pre-specified strain level can be achieved using a deformation that includes one of torsion, upsetting, and drawing, that uses machines such as the above-discussed stand. The stand applies a specified deformation to the billet at the deformed, or strained, section at a pre-specified temperature. This deformation obtains a specified microstructure with intrinsic physical and mechanical characteristics.

It is recommended that reduction of the billet's cross-section, using a hot-metal roller, be done by applying pressure along the billet's axis using stands and clamps; reducing the billet's cross-section by laterally moving the billet through rollers; reducing the billet's cross-section by longitudinal and lateral moving the billet through rollers; reducing the cross-section by moving the billet through rollers that the rotational axes create crossed angles with the billet's axis; reducing the billet by passing the billet through rollers located at 120° from each other; and choosing a length of the treated section not to exceed three minimal diameters of the rod's reduced cross-section. Further, the reduction of the billet's cross-section, which uses a hot-metal roller, may be done while applying torsion using stands and rollers; applying reverse torsion; and applying deformation of the billet's cross-section using a figure roller. The roller profile includes several sections, including a middle section that includes the largest cross section; an intermediate section on both sides of the middle section that have the smallest cross-section; and two end sections.

Alternatively, the method for billet reduction using a hot-metal roller, is by reducing a cross-section through compression along the billet's longitudinal axis; or allowing upsetting the billet after passing the billet through rollers about its lateral axis, in which the length of movement is not greater than the amount of lateral deformation for this section during reduction); allowing the billet's upsetting after longitudinal and lateral rolling about the billet's axis; upsetting the billet while rolling under the following condition:

$$\sigma_u > \sigma_i < \sigma_e,$$

where $\sigma_i$ is the level of stress on the strained section, determined by considering the deformation resistance produced by the rollers during rolling, and $\sigma_u$ is the stress caused by loss of the billet's stability, and $\sigma_e$ is the stress caused by compression of the billet's undeformed sections.

Furthermore, the reduction of the billet's cross-section comprises rolling using a hot-metal roller while continuously and consecutively deforming the length of the billet under treatment; and treating sections of the billet in which the distances between each section are not greater than 3 times the diameter of the billet after treatment.

For a billet formed of single-phase alloys, the deformation method includes deformation is done with a real strain amount is not less than 3, and in particular with a strain amount of 1.4, with the strain rate of $10^1$–$10^{-2} s^{-1}$ at a temperature of $(0.3–0.5) T_{melt}$, where $T_{melt}$ is melting point. For billets formed of a multi-phase alloy, deformation is done with a real strain amount of not less than 3, in particular with a strain amount of 1.4, and with a strain rate of $10^{-1}$–$10^{-4}s^{-1}$ at a temperature of (0.5–0.85) $T_{melt}$, where $T_{melt}$ is melting point.

For titanium alloy billets that comprise a lamellar structure, the deformation method, with a real strain amount of not less than 3, comprises reduction or applying torsion with rolling and upsetting that occurs simultaneous the rolling. These steps are done in addition to the reducing, upsetting, and deforming at 700–Ta.t. and a strain rate $10^{-1}$–$10^{-4}s^{-1}$, where Ta.t. an allotropic transformation temperature. For sections of titanium billet with a lamellar structure, the method is done with not less than 1.1 times reduction of the billet cross-section at temperature of Ta.p.–Ta.p.+(10–50), followed by a coil step at a rate of not less than 1°/s, and applying torsion and upsetting at a temperature not higher than 700–Ta.p. and strain rate of $10^{1}$–$10^{-4}s^{-1}$.

For heat resistant nickel billets, the method includes deforming at temperatures not higher than the temperature of complete dissolution of the γ'-phase, deforming each billet section within 10%–20% of the specified temperature and strain amount, so as not to a change in the stress flow of more than 5%–10%; and deforming each billet section at a specified temperature and strain amount ζ until changes of the strain amount do not increase of the coefficient of the sensitivity rate m=(log $N_1$–log $N_2$)/(log $ξ_1$–log $ξ_2$) Up to amounts of 0.3–0.8; in which $N_1$ and $N_2$ are pressure amounts (moment, pressure of compression, or extension at the corresponding deformation) that are applied to the billet, both before and after the change of the strain amount from the amount $ξ_1$ to the amount $ξ_2$.

In the method, as embodied by the invention, a treated section is subjected to "geometric" de-hardening through cross-section reduction using rollers. The method of the invention deforms of a billet, including sections of the billet's central part. The method also creates conditions for further material treatment. The deformation is not distributed or scattered over the entire billet. Instead, the deformation is localized within selected reduction zones of the billet. Therefore, structural changes to the billet are done only in the particular billet section. A number of different deformation techniques and steps are employed in the method, including rolling, extension, compression, and shearing (torsion). Additionally, the amount and predominant direction of deformation facilitates the formation of the structural changes in the billet.

The temperature that is used in forming a specified microstructure with certain mechanical properties lends to the localization of the deformation. This temperature dependence is due to thermal de-hardening of material. The temperature that is applied to a billet section, as well as any varying of the temperature, can influence the formation of different specified microstructure, for example micro-crystal structure that develops as a result of the initial and dynamic re-crystallization of deformed material. The formation of a given micro-crystal structure may occur over a wide temperature range. The selection of a temperature range for heat treatment of a billet section or the entire billet, depends on the billet material or the microstructure that the method is desired. For example, in the production of a fine-grain microstructure in metals and single-phase alloys, deformation is done at lower temperatures compared with multi-alloyed and multi-phased metallic materials.

Deformation, as embodied by the invention, typically comprises rolling reduction of billet, and includes one of: applying torsion, upsetting, or drawing processes. The deformation process, and the extent to which the process is used, depends on at least one of: intensity of deformation, the microstructure desired, the billet's initial composition, the initial size and shape of the billet, and the final size and shape of the billet.

Usually only one deformation process is applied to a billet that has a relatively small cross-section. For example, torsion can be applied to a small cross-section billet to reduce its grain size on a surface layer, as compared to a middle section. Torsion may also be used when alteration of a billet's cross-section is not required. To create a more unified microstructure within a billet cross-section, drawing and upsetting processes may be used. The upsetting process generally produces a rod with a cross-section that is close to or larger than the rod's initial cross-section. The extension associated with upsetting can produce a smaller billet cross-section than that which the billet initially possessed.

Torsion can be applied to create a uniform microstructure within a given billet cross-section without drawing or upsetting, if the application of torsion is done at temperatures close to those at which super plastic deformation (SPD) occurs. Accordingly, a reduction of a given grain size occurs. During the application of torsion, changes occur within inner regions of the billet, and generally insubstantial changes occur at external layers due to known characteristics of SPD. These steps result in the formation of a uniform fine-grained microstructure in a billet.

Several deformation techniques (steps) may be used for treating of a rod with a relatively wide cross-section. These techniques can be employed consecutively or simultaneously. Multiple deformation techniques used simultaneously decrease axis pressure during deformation. Additionally, treatment of the same section can be repeated by reapplying the previous combination of deformation techniques or by using a modified combination of techniques. For example, decreasing a heating temperature during a subsequent heat treatment session can result in a finer fine-grain microstructure than that which would resulted from just one heat treatment. The overall result of a combination of different treatments produces varying deformation characteristics. Therefore, treatments that are sufficient for the formation of desired and specified physical and mechanical properties of the billet are done.

The particular techniques, and the extent, to which they are used to achieve a particular microstructure, can be influenced by the deformation characteristics of the material. For materials prone to localized deformation, for example titanium alloys, it may be necessary to simultaneously treat the billet using several techniques. This treatment increases the homogeneity of deformation. A similar treatment is useful for alloys of low plasticity, such as heat resistant nickel alloys. For heat-resistant nickel, an increased deformation homogeneity leads to an increase in the deformation of the billet. Further, for materials with a large variety of possible creep systems, for example single-phase nickel alloys, treatment with at least one of the above-described technique is possible.

An economic efficiency, as embodied by the invention, is determined with reference to the amount of energy and materials consumed. To transform a coarse grain microstructure into a fine grain microstructure, extensive deformation of relatively small billet sections may be required. Extensive billet deformation can be done using multiple and repetitive techniques, such as extruding and upsetting of the billet. However, these techniques are highly energy intensive. Another energy intensive method is comprehensive billet forging, which is often used to produce a homogeneous fine grain microstructure. Multiple heating of the billet may be required since a single heat treatment will not achieve a uniform grain size reduction in these materials. Multiple heating is highly energy intensive, and is a multi-forging technique requiring upsetting of the billet with alternating compression directions. This technique results in billet sections with intense deformation, minor deformation and sections where deformation is not present. This type of deformation distribution leads to excessive energy use because strain recovery occurs in the under-treated sections. Therefore, in these sections, more energy is used to accumulate structural defects that are needed for re-crystallization method.

In the method, as embodied by the invention, deformation is localized in the billet. Therefore, a re-crystallization dislocation density can be reached in the localized much faster when compared with upsetting and forging. Additionally, the energy consumption to overcome friction forces is decreased. This decrease is because creep friction that occurs during extruding and upsetting is replaced by rolling friction by rollers.

The raw material savings that result using the method, as embodied by the invention, as opposed to forging, result from a reduction in the number of production steps to achieve a particular microstructure. The method can comprise a one step method; so loses of metal due to repeated heating and flash removal are avoided. The method, as embodied by the invention, also permits the production of billets that are free from minor reductions of cross-sectional diameters. Rods of a small initial diameter may be treated by the method, as embodied by the invention, rather than forging. Therefore, it is possible to avoid the use of large diameter billets that lack chemical, phase and grain homogeneity.

The method, as embodied by the invention, does not need heavy equipment and heavy load presses. Forces for achieve upsetting are less than that involved during the known upsetting. Additionally, the method, as embodied by the invention, can be used to correct a rod shape, such as its curvature and circumference. This method also promotes material savings, and the rolling improves shaping accuracy and surface clarity (also known as its "finish").

The method, as embodied by the invention, permits the production of large diameter long rods that possess physical and mechanical properties that correspond to a fine-grain structured material. The method allows production of a shaft, in which a part includes increased heat resistance as a result of a relatively coarse grain structure and other parts include high strength characteristics from grain refinement. The method, as embodied by the invention, also permits the manufacture of billets with various sized cross-sections, diameters, and lengths, and can maintain an initial billet size.

The following examples of methods, as embodied by the invention, provide a billet with material plasticity: rolling and applying an extension force along a billet's axis during reduction to elimination of ridge formation from the material displaced by rollers; rolling the billet through at least three rollers, which can be located at 120° from each other, created by side hydrostatic backwater; applying reverse torsion, as the changes in deformation direction and increase in creep are evident; and reducing by applying compression along a billet's axis. Additionally, upsetting steps can be done simultaneously with rolling.

For increasing billet stability during treatment, the following techniques (steps) can be employed: upsetting a billet after rolling about its lateral axis, in which the movement amount should not be greater than the lateral deformation amount; and upsetting simultaneously with rolling under the following conditions: $\sigma_u > \sigma_{i<oe}$.

Additional methods, as embodied by the invention, include: upsetting after longitudinal and lateral rolling about the billet's axis; continuously and consecutively deforming the length of the billet under treatment pressure; and rolling the billet so that the rotational axes create crossed angles with the billet's axis rollers that are located at 120° from each other.

Deforming a billet section that has a length not greater than three billet's diameters can produce structurally inhomogeneous billet sections. The billet ends will possess a fine-grain microstructure, while middle parts possess a coarse grain microstructure. After upsetting, the billet may be formed into homogeneous discs.

The methods, as embodied by the invention, include heating to a specified temperature and subjecting to strain $\epsilon_{tr}$ a strain rate to produce a fine-grain microstructure. To produce a material with small-angled grains (sub-grains), a strain amount of $\epsilon_{tr}=0.3-0.6$ is appropriate, when $\epsilon_{tr}$ is a true strain. When refining grains up to 10 $\mu$m, the strain amount should be $\epsilon_{tr} \geq 3$, while to form sub-micro-crystal or nano-structure, the true strain amount is $\epsilon_{tr} \geq 5$. Accordingly, a higher strain corresponds to a smaller sized grain.

For single-phase materials, lower heating temperatures can be used because of grain growth characteristic differences compared with multi-phases materials. A microstructure of multi-phases materials is more stable so a dissolution temperature, which suppresses the growth of grains, limits the upper temperature limit. The lower temperature limit is determined by a material's diffusion activity. For example, for heat resistant nickel alloys, the heating temperatures are 0.5 $T_{melt}$, where $T_{melt}$ is the melting point as well as the dissolution temperature for the hardening intermetallic phase. For titanium alloy billets, the heating temperature is limited to ($T_{a.t.} -150°$ C.), where $T_{a.t.}$ is the temperature of the allotropic transformation.

A strain rate, as embodied by the invention, corresponds to the super-plasticity condition because transformations are intensified. For titanium alloys to achieve a complete transformation to a fine-grained microstructure, several deformation techniques can be used simultaneously. These techniques may include applying torsion, rolling, and upsetting. Another method, as embodied by the invention, to treat large cross-section titanium alloy rods heats a billet to a temperature of $T_{a.t.}-T_{a.t.}+(10-50)°$ C., followed by reducing its cross-section from 1.5–2 times. The treated section is then cooled or quenched at a rate of not less than 1°/s. Torsion and upsetting may then be applied, for example by rollers, at a temperature not higher than $T_{a.t.}$ This method increases hardnenability and causes development of thin colonies of $\alpha$-phase grains. Additionally, this method promotes the development of a more homogeneously dispersed microstructure during deformation treatment at temperatures below the allotropic transformation temperature.

The method, as embodied by the invention, allows monitoring of the mechanical parameters of deformation, such as the coefficient of the rate sensibility of the stress flow m. This coefficient is monitored during tension, extension, and compression treatments. Precise monitoring at stages during torsion treatment is possible to assess the transformation of the initial structure into the required micro-crystal microstructure. If m is greater than 0.3, or with further increases of deformation pressure amounts does not change significantly, then major structural changes are complete and that a fine-grained microstructure has been formed.

Examples of the Method in Operation.

Figure 1:
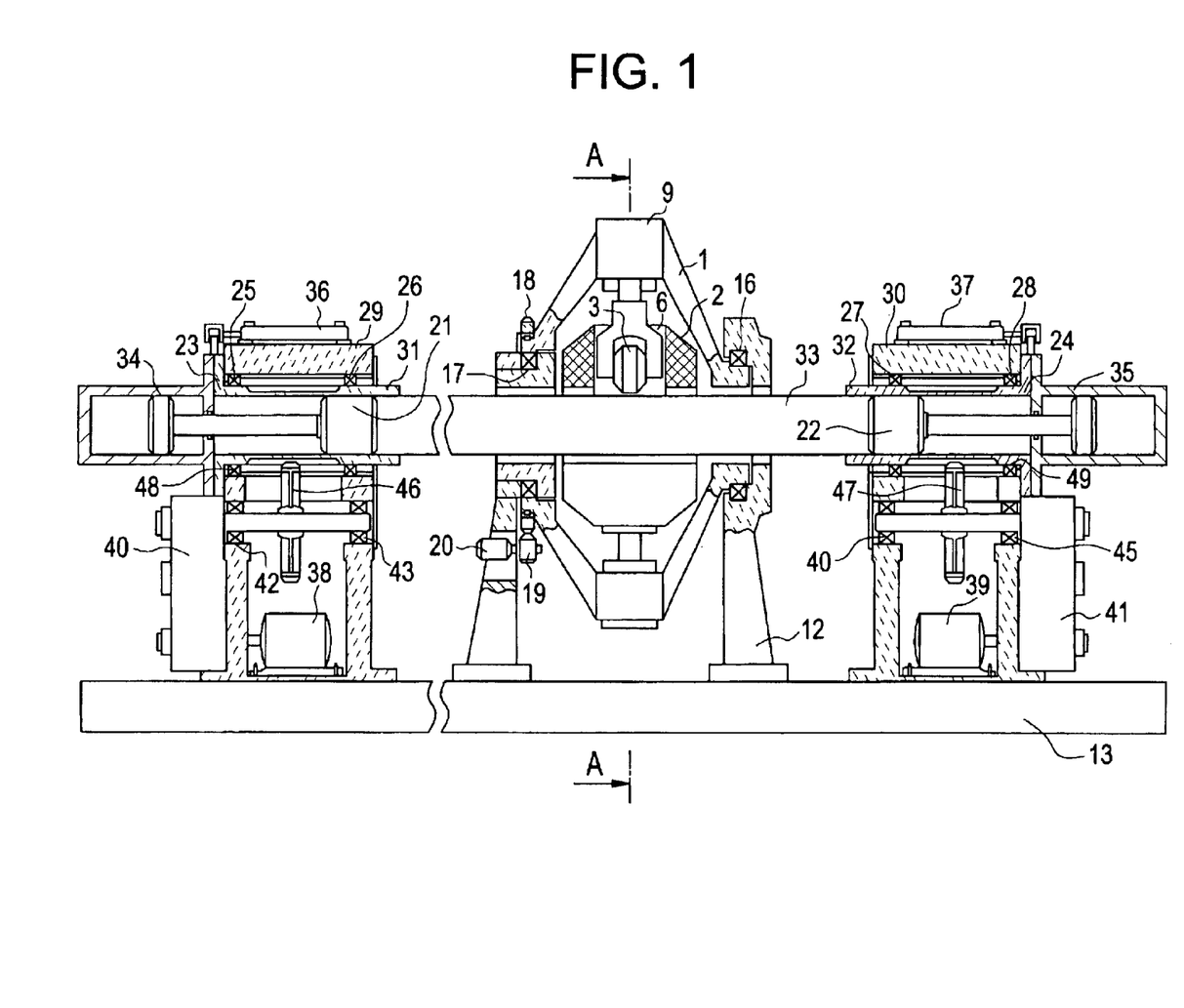
FIG. 1 illustrates a unit's components for the method, as embodied by the invention.
Figure 2:
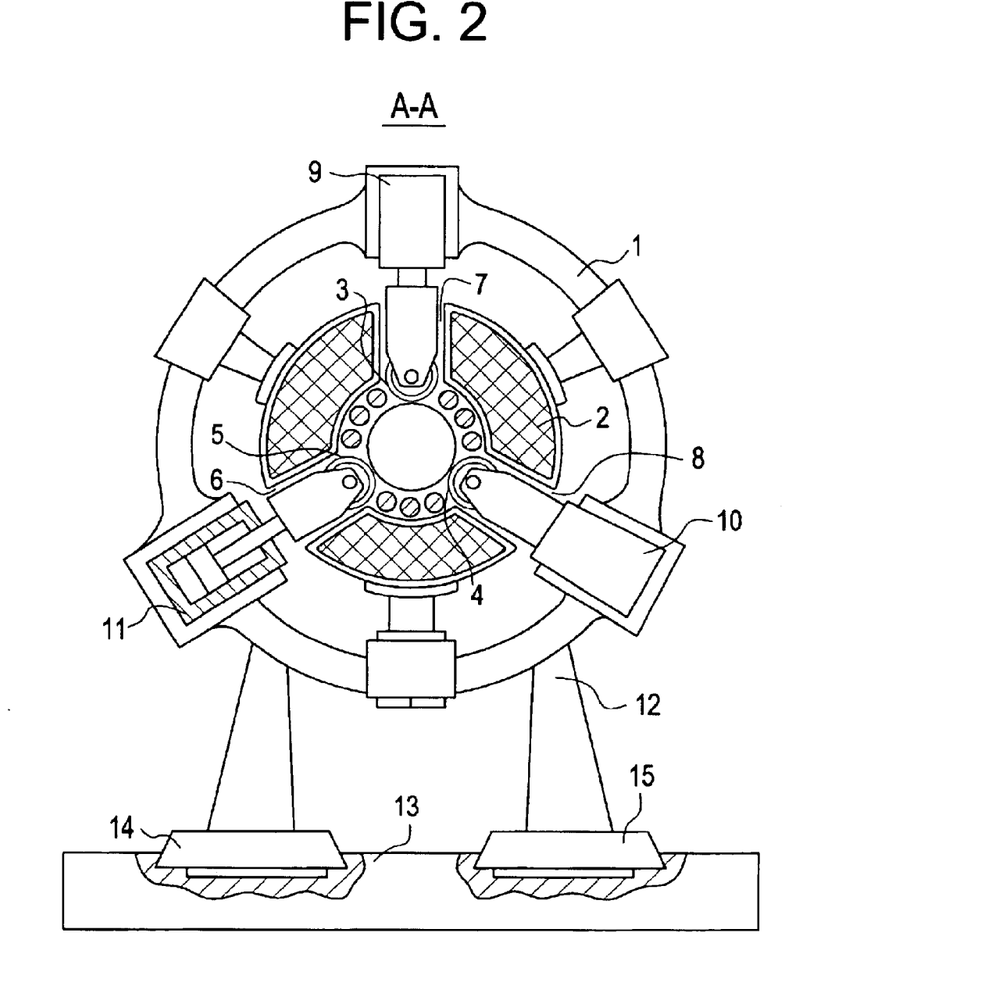
FIG. 2 illustrates cross section A—A of the unit of FIG. 1.

FIGS. 1 and 2 illustrate the unit that applies the steps of the method, as embodied by the invention. The unit comprises a frame 1, furnace 2, and three rollers 3, 4, and 5. The rollers are inserted into the furnace though windows 6, 7, and 8. The unit also contains hydro-cylinders 9, 10, and 11 for lateral transformation of the rollers. A carriage 12 is mounted on a frame or plate 13 may be moved incrementally along guides 14, 15 within the frame 13. Bearings 16 and 17, gears 18 and 19, and a drive 20 rotate of frame 1. Mobile stands 21 and 22 are located within a body of pins 23 and 24. The pins correspondingly are mounted on the bearings 25, 26, 27, and 28 in the bodies of left 29 and right 30 stocks. The stocks 29 and 30 are also mounted on the frame 13 for movement along the guides 14 and 15. The end parts 31 and 32 of the pins 23 and 24 act as clamps during torsion and extension of the billet. A mechanism for griping billets between clamps is not illustrated in FIG. 1. Additionally, the unit has drives 34 and 35 for moving the stands 21 and 22 and loading the billet 33 with axial forces. The drives 36 and 37 are use to move the pins 23 and 24 with clamps 30 and 31. Electric motors 38 and 39 provide torsion forces to the billet 33 through redactors 40 and 41, and bearings 42, 43, 44, and 45 and pairs of gears 46 and 47, and 48 and 49.

FIGS. 3A–3H illustrate systems for treating the billet, as embodied by the invention. The figures illustrate that stands 21 and 22 can be moved along the billet's axis, and also permit reverse torsion applications using clamps 31 and 32 and three rollers 3, 4, and 5 located at an angle of 120°. Roller 5 is not illustrated in FIG. 5.

Figure 4:
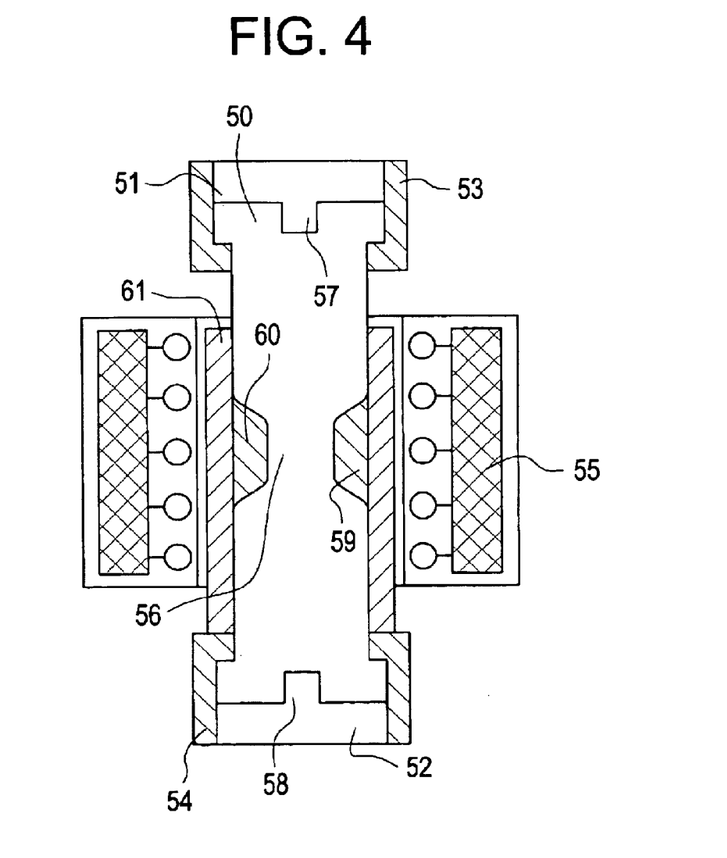
FIG. 4 illustrates a unit, as embodied by the invention.

FIG. 4 illustrates operation of the unit. The stands 51 and 52 can be moved along the sample's axis and permit application of reverse torsion using clamps 53 and 54. Furnace 55 provides a heat source 56 with which to heat the billet. At the billet's butt-end 50, slots 57 and 58 are introduced to aid movement during torsion. Inserts 59 and 60 that imitate the role of the rollers and stabilize the billet during upsetting hold the treated section 56. A clamp 61 stabilizes the inserts during the upsetting and application of torsion steps. The clamp and inserts are made from the softer material than the billet under treatment.

EXAMPLE 1

A method, as embodied by the invention, is done in a unit as illustrated in FIG. 1. The explanation of the method is with respect to FIGS. 3A–3H. The rod-shaped billet 33 is several times longer than it is wide. When treatment commences, the billet is mounted on stands 21 and 22 and held between clamps 23 and 24. The rollers 3, 4, 5, along with the furnace 2, move the section on a carriage 12 along the frame 13. The furnace 2 is not illustrated in the figures.

Generally, the particular section selection for treatment is unrestricted. However, selection of a given section depends on the purpose for which it will later be used. If the middle of a billet 33 is to be treated, then the ends of the billet are located on stands 21, 22 and held with clamps 23, 24. Thus, rollers 3,4,5 along with the furnace 2 move the treated part on a carriage 12. If treatment of the whole billet 33 is desired, the furnace 2 and rollers 3, 4, 5 are moved from one end of the billet, for example, the right one. In this scenario, the rollers act as stands.

Figure 3A:
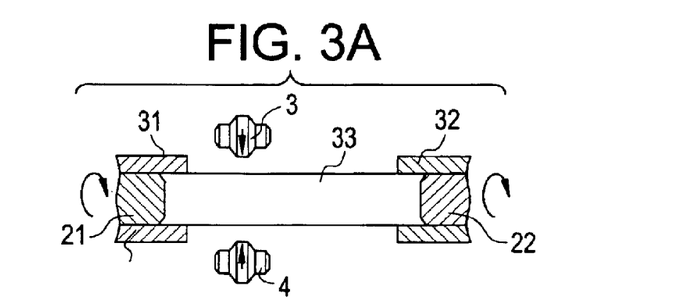
FIGS. 3A–3H illustrate schemes of the treatment method, as embodied by the invention, at different stages in the method.
Figure 3B:
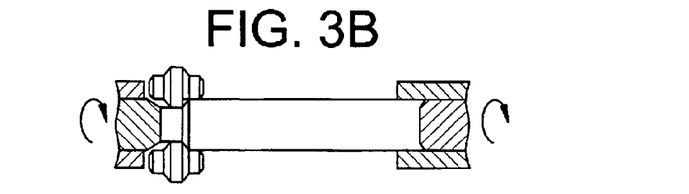
Figure 3C:
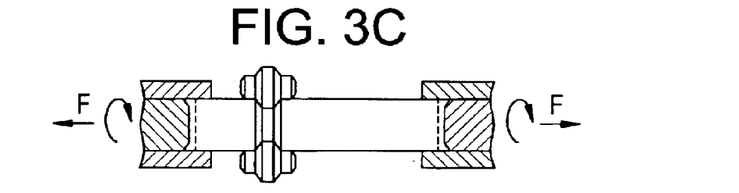
Figure 3D:
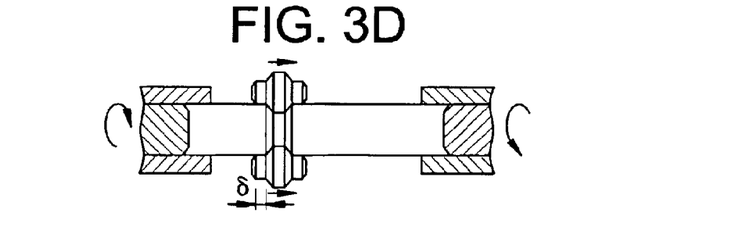
Figure 3E:
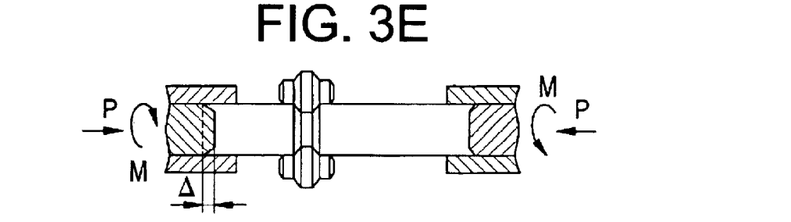
Figure 3F:
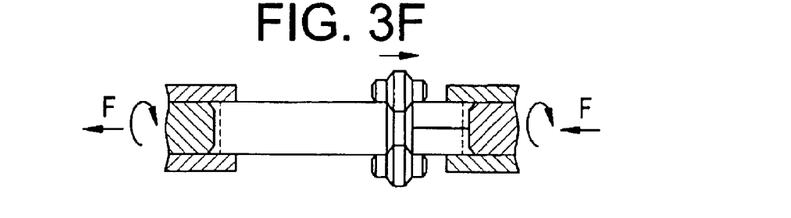
Figure 3G:
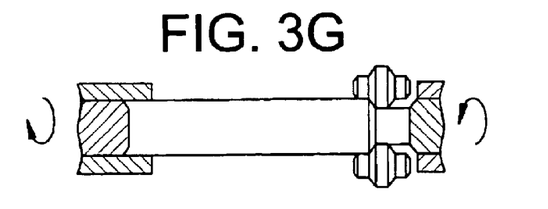

After heating the billet 33 to the deformation temperature, the billet is rotated by electric motors 38, 39, redactors 40, 41, and pairs of gears 46–49. Reduction is done by rolling of sections of billet, and also as a result of roller transportation in the lateral axis of the billet. This movement may be achieved using hydro-cylinders 9, 10, 11. To improve the reduction of the billet's ends and preventing formation of ridges (buckling) on the unreduced section surface, the rotational axis creates specific crossed angles within the billet's axis. In this case, force is directed along the billet's axis. This force provides displacement of part of the treated section in the direction of the billet's axis. The amount of this displacement is equal to the amount displaced by rollers. FIG. 3C illustrates sectional reduction of the part that is not located at the billet end. Extension forces F are applied though clamps 31, 32. As in the previous case, ridges are not created because the impact of the rollers and clamps provide displacement at either end of the billet. As before, the amount of this displacement is equal to the amount of the metal that is displaced by rollers. In FIG. 3C this displacement is illustrated by the dotted lines. The length of the reduced section is limited by the billet part that is heated up to the deformation temperature. FIG. 3D illustrates that the length of the reduced section is greater then the length of the rollers. Moments M, which have opposed directional forces, are applied to the ends of the billet. These moments M provide plastic torsion of the treated section (FIG. 3E). During plastic torsion, the surface is rolled, and after torsion, depending on the cross-sectional size of rod, the rollers and furnace are moved along the billet's axis or upsetting is applied. Then treatment of the next section begins.

Movement to a new billet section can be done by a step-by-step by lateral roller removal from the billet, placing the rollers along the billet's axis and repeating the steps on the next billet section by placing the rollers along the billet's axis. The rollers rotational axes create angles with the billet's axis, simultaneously moving the rollers along and across the billet while applying extension forces.

Upsetting is done by application of compression forces P on the billet. Rolling of the billet section under treatment is simultaneous with upsetting to provide deformation homogeneity. Upsetting can use different steps. One step is illustrated in FIGS. 3D and 3E. Before the upsetting begins, the rollers are moved to one end of the billet, for example the right end. Accordingly, a gap δ is formed between the rollers and the left side of the billet. The positioning of the right side rollers and stand is fixed. The left stand is then displaced by amount Δ. This amount is sufficient to conduct, through the application of force P, upsetting on the left-hand side of the treated section. The upsetting continues until the gap disappears.

Figure 3H:
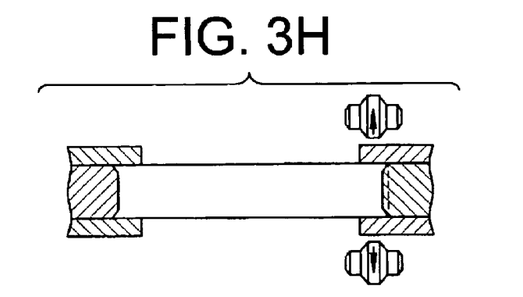

Also, upsetting is done along the entire length of a treated billet section. The stands, together with the movement force, apply pressure forces P to the billet. Additionally, the rollers move laterally and increase of the diameter of the strained section to roll the billet surface and prevent the barrel formation. To decrease the strain pressure and increase the homogeneity deformation, the billet section is simultaneously treated applying plastic torsion and upsetting. Upsetting can be applied simultaneously with the above-described rolling. This method continues until all sections between the stands are treated, as in FIGS. 3F and 3G. A butt-end of the billet is treated using the same steps as those applied at the beginning of the billet. Upsetting steps for a billet are shown in FIG. 3H.

EXAMPLE 2

Several alloys are treated using the method, as embodied by the invention. The treatments are done using two-phase titanium alloy "BT8" possessing an initial, coarse lamellar structure. The titanium (α+β) alloys tend to exhibit localizes deformation, however lamella α-phases are stable. Thus, these alloys do not form a homogeneous micro-crystal structure as readily as heat resistant nickel alloys. In addition to BT8alloy, a multi-phase heat resistant nickel alloy "Ý I962" is treated. In order to reduce costs, the treatments were done on alloys with a diameter of 15 mm and length of 50 mm using the unit illustrated in FIG. 4.

EXAMPLE 2.1

Figure 5:
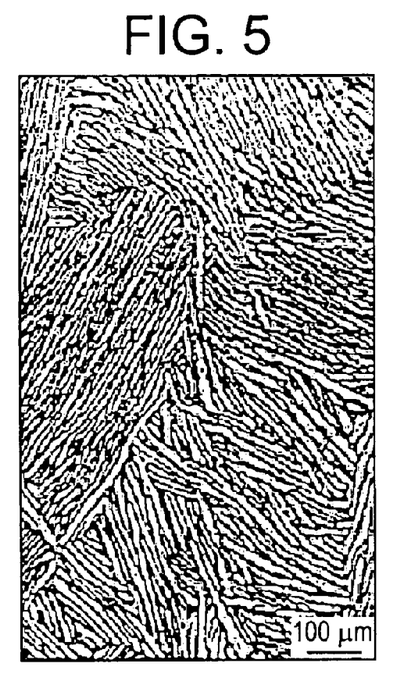
FIG. 5 illustrates a microstructure of a BT8 titanium alloy sample before treatment.
Figure 6:
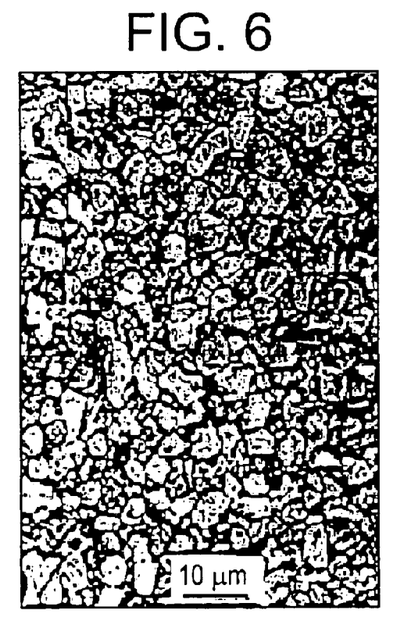
FIG. 6 illustrates a microstructure of the BT8 titanium alloy sample (FIG. 5) after treatment using the method, as embodied by the invention.

The treatment investigated producing a specified microstructure, including a homogeneous globular microcrystal microstructure in one section of two-phase titanium alloy BT8sample. Several samples are produced. Initially, the samples possess a lamellar microstructure (FIG. 5). The size of the transformed β-phase grains are 1500–2000 μm, and colonies of α-phase grains are 200–300 μm. The section to be treated has a diameter and length of 10 mm. During compression, the cross-sectional size of the section is close to its initial diameter. Samples 1, 2 and 3 are treated using the method, as embodied by the invention, at 950° C.; sample 4 is treated according to the conditions in Table 1. This Table also contains the results of the treatments.

TABLE 1

| Sample Number | Treatment Conditions | Treatment Results |
|---|---|---|
| 1 | Upsetting to reduce a section with the true strain equals 1. | Bent and crashed plates into fragments with partial structural globalization. |
| 2 | Torsion of reduced section on two turns with the following upsetting with true strain equals to 1. Average summed strain of the billet is 3. | 85% formation of a globular structure with an average grain size of 5 μm. |
| 3 | Torsion of the reduced section on 8 turns and upsetting with the true strain equal to 1. Average summed strain of the billet equals 8.5. | 95% formation of a globular structure with an average grain size of 5 μm. |
| 4 | Torsion of the reduced section on 8 turns and upsetting with the true strain equals 1. Average summed strain of the billet is 8.5. | Formation of a homogeneous globular structure throughout the cross-section. |

EXAMPLE 2.2.

This treatment is designed to create a micro-crystal structure in heat resistant nickel alloy using the method and steps, as embodied by the invention. A sample of a coarse-grain heat resistant nickel alloy (ÝI962), with an average grain size of 100 μm, is held in clamps as illustrated in FIGS. 3A–3H. The sample was heated to a temperature of 1080° C. After heating, plastic torsion is applied to the billet.

The application of torsion is done until the sample is no longer stable-up to 5% from an average amount. The upsetting is done until the diameter of the section is approximately equal to its initial diameter. Torsion is applied simultaneously with an application of strain. An average summed strain amount is 3.8. Metallographic analysis reveals that a micro-duplex microstructure forms with matrix grain sizes with a 3–4 μm range and inter-metallic phase grain sizes with a 1–2μ range. The method, as embodied by the invention, produces grain refinement in different materials. Additionally, the method confirms that a structurally inhomogeneous billet could be produced.

EXAMPLE 2.3

A sample of a titanium alloy (BT8) with a lamellar structure was treated. This treatment produces an inhomogeneous structure with a diameter of 15 mm and length of 20 mm. The butt-end microstructure (a distance from the ends at about 5 mm) should be a micro-crystal microstructure with the middle section being of coarse grain with a lamellar microstructure. Two 10 mm sections located 20 mm from each other are treated as in Example 2.1. The middle sections are then cut. The sample is then subjected to upsetting. The strain amount is 80% with a strain rate of $10^{-3}$ $s^{-1}$ at 950° C. For comparison purposes, a homogeneous coarse-grained billet is subjected to upsetting under the same conditions. Results indicate that in a structurally inhomogeneous sample, the "barrel shape" and under-formed zones are absent while a globular homogeneous microstructure is formed. However, the coarse-grained homogeneous sample exhibited "barrel shape" sides, end zones without deformation and a globular microstructure. This Example demonstrates advantages of the method, as embodied by the invention.

Theoretical Results and an Assessment of the Method when Applied to Over-Length Billets.

Treatments using fall-length large diameter billets are expensive, thus a theoretical assessment of different conditions and steps, as embodied by the invention, were done. The deformation amount of applied force needed treatment time, and initial pressure amount necessary to commence upsetting without encountering loss of the billet's structural stability were assessed. The results indicate that the method, as embodied by the invention, can comprise several deformation steps applied simultaneously. For example, applying reduction, drawing, upsetting, and applying torsion simultaneously can produce refined grains. The steps of holding deformation for grain refinement as well as decreasing axial pressure provided desirable results. For example, during the application of torsion, the pressure for upsetting a given billet section with a diameter in a range from 100 to 250 mm, is less than 10 tons at a strain rate of 5 mm/min and 60 tons at the strain rate of 50 mm/min. For upsetting without torsion, applied pressure of 3 to 5 times the above may be needed. In comparison, micro-crystal structured rods with a 100–250 mm diameter formed from heat resistant nickel and titanium alloys can be produced by extrusion (pressing) and applying several thousand tons of force. Calculations show that upsetting with torsion pressure deforms a billet without causing a loss of structural stability. Therefore, forces applied are less than a critical force that causes the billet to bend. Accordingly, the torsion moment required for a billet, with a diameter of 100 to 300 mm, is 1–14 tm.

The time to create a fine grain microstructure in a 100 mm long section, at the above-mentioned strain rate, is 2–10 minutes, and for a 2 meter rod length, with the diameter of 100–300 mm, is about 2 hours. These times are comparable with times for isothermic forging of billets with diameters of 200 mm and lengths of 400–500 mm.

While various embodiments are described herein, it will be appreciated from the specification that various combinations of elements, variations or improvements therein may be made by those skilled in the art, and are within the scope of the invention.

We claim:

1. A metal and alloy treatment method to deform at least a section of a billet through reduction of the billet's cross-section, the method comprising:

reducing a cross-section of the billet section by rolling the billet alone and across its axis under the following conditions:

$$\sigma_u > \sigma_i < \sigma_e,$$

where $\sigma_i$ is stress on the billet section according to deformation resistance produced by rollers during the rolling, $\sigma_u$ is stress caused by loss of billet stability and $\sigma_e$ is stress caused by compression; and applying strain by a step selected from applying a torsion force and applying an extension force;

wherein a microstructure is provided with intrinsic physical and mechanical characteristics.

2. A method according to claim 1, wherein the step of reducing the billet's cross-section comprises applying pressure along the billet's axis using stands and clamps.

3. A method according to claim 1, wherein the step of reducing the billet's cross-section comprises laterally rolling the billet with rollers.

4. A method according to claim 1, wherein the step of reducing the billet's cross-section comprises longitudinal and lateral rolling the billet through rollers.

5. A method according to claim 1, wherein the step of reducing the billet's cross-section comprises rolling the billet and creating forces directed at angles to the billet through rollers in which the rotational axes create crossed angles with the billet's axis.

6. A method according to claim 1, wherein the step of reducing the billet's cross-section comprises passing the billet through three rollers located at 120° from each other.

7. A method according to claim 1, wherein the length of a deformed billet does not exceed three minimal diameters of the billet's reduced cross-section.

8. A method according to claim 1, wherein the step of reducing the billet's cross-section comprises applying compression along the billet's longitudinal axis.

9. A method according to claim 1, wherein the step of deforming comprises applying torsion using stands and rollers.

10. A method according to claim 1, comprising a step of applying reverse torsion.

11. A method according to claim 1, comprising rolling with a roller comprising at least a large middle section and smaller cross-sectioned intermediate sections on both sides of the middle section.

12. A method according to claim 1, further comprising a step of upsetting the billet after the steps of reducing cross-section and applying strain by rolling the billet about its lateral axis.

13. A method according to claim 1, comprising applying strain to at least one section of a single-phase alloy billet at a strain amount of 1.4, a strain rate of $10^1$–$10^{-2} s^{-1}$ and at a temperature of $(0.3–0.5) T_{melt}$, where $T_{melt}$ is melting point.

14. A method according to claim 1, comprising applying strain to at least one section of a multi-phase alloy billet at a strain amount of 1.4, a strain rate of $10^{-1}$–$10^{-4} s_{-1}$ and at a temperature of $(0.5–0.85) T_{melt}$ (where $T_{melt}$ is melting point).

15. A method according to claim 1, comprising reducing, applying strain and additionally upsetting at least one section of a titanium alloy billet at 700–Ta.t. and at a strain rate of $10^{-1}$–$10^{-4} s^{-1}$, where Ta.t. is an allotropic transformation temperature.

16. A method according to claim 1, comprising reducing, applying strain and additionally upsetting at least one section of a titanium alloy billet at 700–Ta.t. and at a strain rate of $10^{-1}$–$10^{-4} s^{-1}$, where Ta.t. is an allotropic transformation temperature and subsequently applying a strain amount of not less than 3 by a step of rolling or by steps of rolling and applying torsion.

17. A method according to claim 1, comprising reducing, applying strain and additionally upsetting at least one section of a titanium alloy billet at 700–Ta.t. and at a strain rate of $10^{-1}$–$10^{-4} s^{-1}$, where Ta.t. is an allotropic transformation temperature and subsequently applying a strain amount of not less than 3 by a step of rolling with upsetting and applying torsion.

18. A method according to claim 1, comprising reducing at least one section of a titanium alloy billet with a lamella microstructure to effect not less than 1.1 times reduction in cross-section at Ta.t–Ta.t.+(10–50), and further comprises cooling the at least one section at a rate of not less than 1°/s, followed by steps of applying torsion and upsetting at a temperature not higher than 700–Ta.t. at a strain rate of $10^{-1}$–$10^{-4} s^{-1}$.

19. A method according to claim 1, comprising applying strain to at least one section of a heat resistant nickel billet at a strain amount of 1.4, a strain rate of $10^{-1}$–$10^{-4} s^{-1}$ and at a temperature not higher than a temperature of complete dissolution of a γ'-phase.

20. A method according to claim 1, comprising applying strain to the billet section until a single-amount increment of strain within 10%–20% of a specified temperature and strain amount does not change stress flow, $\sigma_p$, of more than 5%–10%.

21. A method according to claim 1, comprising applying strain to a nickel billet section at a temperature not higher than a temperature of complete dissolution of the γ'-phase.

22. A method according to claim 1, comprising applying strain to a nickel billet section at a temperature not higher than 10%–20% of a temperature less than a temperature of complete dissolution of the γ'-phase.

23. A method according to claim 1, comprising applying strain to a nickel billet section at a temperature not higher than 10%–20% of a temperature less than a temperature of complete dissolution of the γ'-phase and at a strain amount increase of not greater than a 0.3–0.8 increase in coefficient of sensitivity rate m=(log $N_1$–log $N_2$)/(log $\xi_1$–log $\xi_2$) in which $N_1$ and $N_2$ are pressures applied to the billet section before and after change of strain amount from $\xi_1$ to $\xi_2$.

* * * * *